US012234053B1

(12) United States Patent
Wang

(10) Patent No.: US 12,234,053 B1
(45) Date of Patent: Feb. 25, 2025

(54) SPRAY BOTTLE WITH STORAGE FUNCTION

(71) Applicant: Daolong Wang, Sichuan (CN)

(72) Inventor: Daolong Wang, Sichuan (CN)

( * ) Notice: Subject to any disclaimer, the term of this patent is extended or adjusted under 35 U.S.C. 154(b) by 0 days.

(21) Appl. No.: 18/747,945

(22) Filed: Jun. 19, 2024

(51) Int. Cl.
*B65D 1/04* (2006.01)
*B05B 11/10* (2023.01)

(52) U.S. Cl.
CPC ............ *B65D 1/04* (2013.01); *B05B 11/1042* (2023.01)

(58) Field of Classification Search
CPC .... B65D 21/00; B65D 21/02; B65D 21/0233; B65D 21/0235; B65D 21/0237
See application file for complete search history.

(56) References Cited

U.S. PATENT DOCUMENTS 4,607,756 A 8/1986 Courtman
4,925,066 A * 5/1990 Rosenbaum ........ B05B 11/0037 222/129
5,065,875 A * 11/1991 Balavich ............ B65D 21/0237 215/10
5,316,398 A * 5/1994 Chandaria .......... B65D 21/0237 132/297
6,415,624 B1 * 7/2002 Connors ............... F25D 31/007 62/530
7,926,682 B2 * 4/2011 Nelson ............... B65D 81/3211 222/129
9,540,149 B2 1/2017 Worthington
9,932,147 B1 * 4/2018 Ahlm ..................... B65D 69/00
11,591,136 B2 * 2/2023 Burt .......................... A45F 3/18
11,648,568 B2 5/2023 Vanfleet
2002/0038823 A1 * 4/2002 Tardif ...................... B05B 15/40 222/329
2003/0000961 A1 * 1/2003 Klima ....................... B65D 1/20 222/83.5
2005/0067414 A1 * 3/2005 Lipson ............... B65D 21/0238 220/23.89
2005/0161423 A1 * 7/2005 Pick ................... B65D 21/0237 215/6
2005/0247729 A1 * 11/2005 Durant ................. A01G 25/145 222/129
2008/0049414 A1 * 2/2008 McKay, Sr. ............. A47L 13/26 222/192
2009/0261098 A1 10/2009 Coffey
2009/0308889 A1 * 12/2009 Lindsay .............. B05B 11/0097 222/129
2016/0158776 A1 * 6/2016 Sternberg ............... B65D 23/12 222/130
2022/0339638 A1 * 10/2022 VanFleet ................. B05B 15/25
2022/0388705 A1 12/2022 Dennewald
2023/0278761 A1 9/2023 Tu

FOREIGN PATENT DOCUMENTS

GB 2468894 A * 9/2010 ........... A46B 5/0033

* cited by examiner

*Primary Examiner* — Donnell A Long
(74) *Attorney, Agent, or Firm* — Birchwood IP

(57) ABSTRACT

The embodiments of the present disclosure provide a spray bottle with storage function, which includes a spray bottle body. The spray bottle body is provided with a storage box, allowing liquid and other solid seasonings to be separated but be contained together. The storage box for containing the solid seasonings is equipped with a box cover exposed outside the spray bottle body. When sprinkling the seasonings, it is only necessary to open the corresponding box cover without separating the storage box from the spray bottle body. It is more convenient to use, occupies less space and is easy for storage.

9 Claims, 10 Drawing Sheets

A

SPRAY BOTTLE WITH STORAGE FUNCTION

TECHNICAL FIELD

The present disclosure relates to the technical field of spray bottles, and in particular, to a spray bottle with storage function.

BACKGROUND

A delicious dish typically requires a variety of seasonings, such as oil, salt, and other spices, to enhance its flavor. These seasonings need to be stored in different containers in the kitchen, which take up a lot of space and make storage more cumbersome.

SUMMARY

A spray bottle with storage function includes a spray bottle body. The spray bottle body is arranged with a storage box, the storage box is defined with at least one accommodating cavity, the storage box is arranged with a box cover outside the spray bottle body, and the box cover is able to open or seal an opening of the accommodating cavity.

BRIEF DESCRIPTION OF DRAWINGS

The description and drawings that constitute part of the present disclosure are provided for a further understanding of the present disclosure. The illustrative embodiments and their descriptions are provided for explanatory purposes but do not constitute an improper limitation of the present disclosure.

DETAILED WAY

Figure 1:
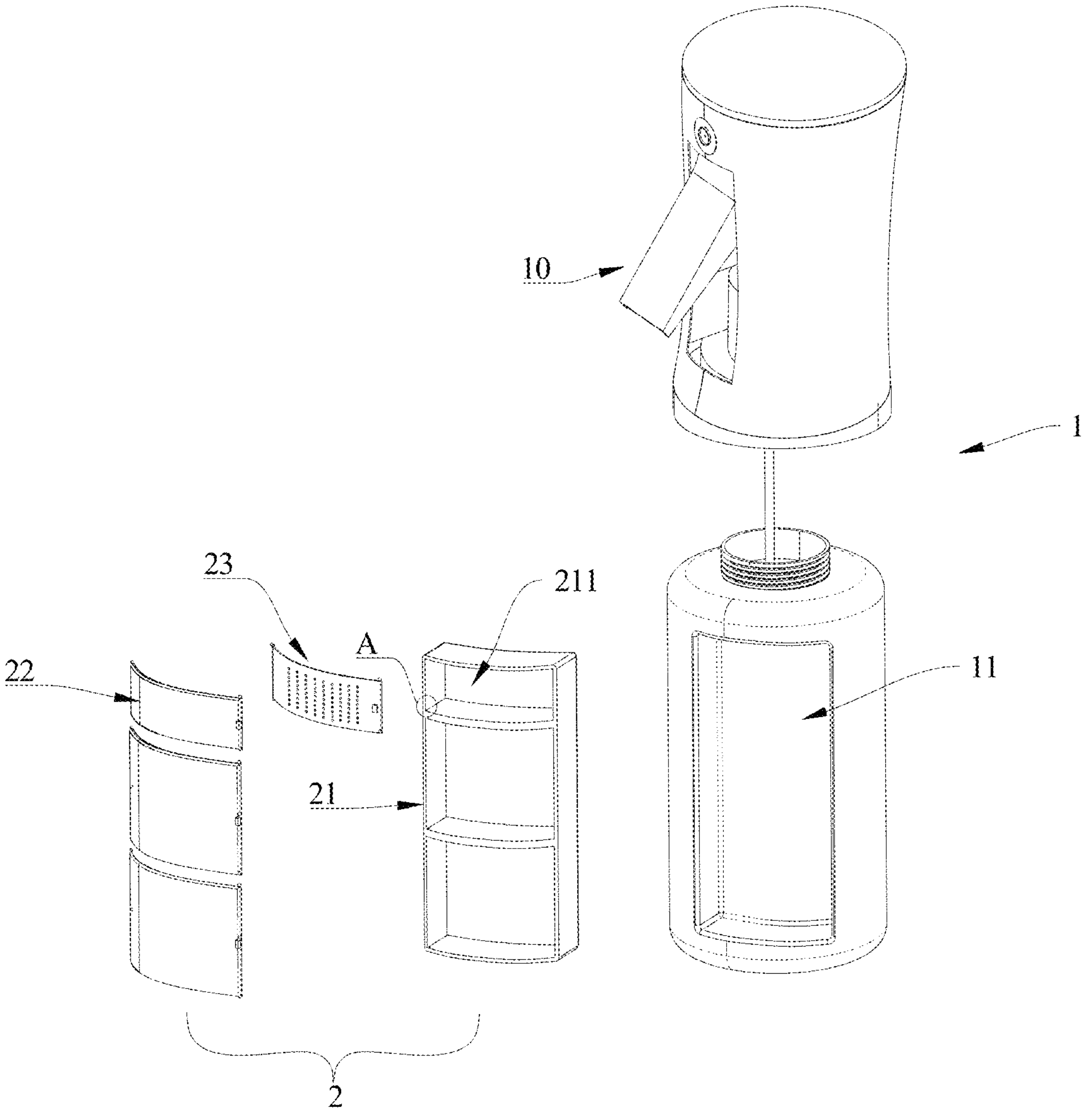
FIG. 1 is an overall exploded schematic structural view of a spray bottle with storage function according to some embodiments of the present disclosure.

The present disclosure will be described in detail below with reference to the accompanying drawings and in conjunction with various embodiments. Each example is provided to explain but not limit the present disclosure. In fact, it will be clear to those of ordinary skill that modifications and variations may be made without departing from the scope or spirit of the present disclosure. For example, a feature shown or described as part of one embodiment may be used in another embodiment to produce yet another embodiment. Therefore, it is intended that such modifications and variations included in the present disclosure are within the scope of the appended claims and their equivalents.

In the description of the present disclosure, the terms such as "longitudinal", "lateral", "upper", "lower", "front", "back", "left", "right", "vertical", "horizontal", "top", "bottom" and the like indicate the orientation or positional relationship based on the orientation or positional relationship shown in the drawings, which is only for the convenience of description and does not require the present disclosure to be constructed and operated in a specific orientation. Therefore, they may not be understood as limiting the present disclosure. The terms "connected", "connecting" and "arranged" used in the present disclosure should be understood in a broad sense. For example, it may refer to a fixed connection or a detachable connection; it may be directly connected or indirectly connected through an intermediate component; it may refer to a wired electrical connection, a radio connection, or a wireless communication signal connection. For those of ordinary skill in the art, the specific meanings of the above terms may be understood according to the specific circumstances.

One or more examples of the present disclosure are shown in the attached drawings. Numbers and letter signs are used in the detailed description to refer to features in the drawings. Similar marks in the drawings and descriptions have been used to refer to similar parts of the present disclosure. As used herein, the terms "first", "second" and "third" are used interchangeably to distinguish one component from another, and are not intended to indicate the position or importance of individual components.

Figure 2:
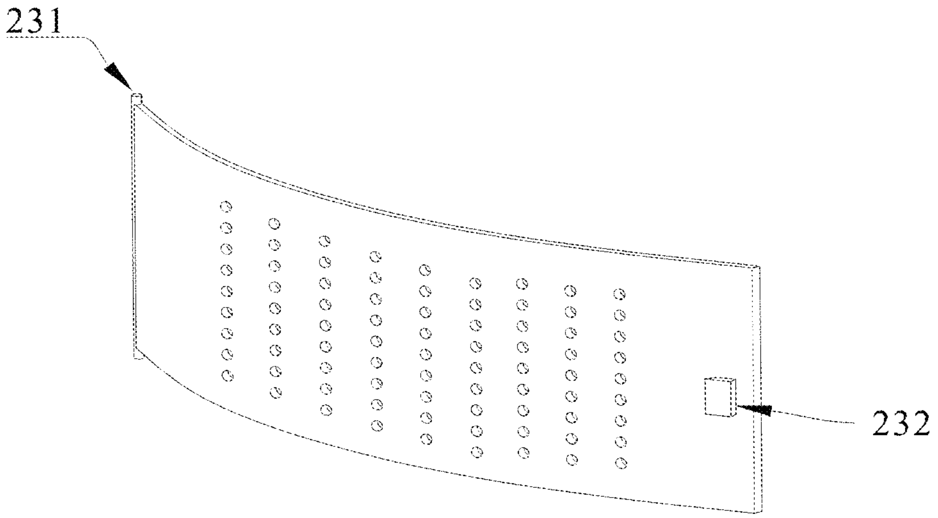
FIG. 2 is a schematic structural view of a first shaker lid according to some embodiments of the present disclosure.
Figure 3:
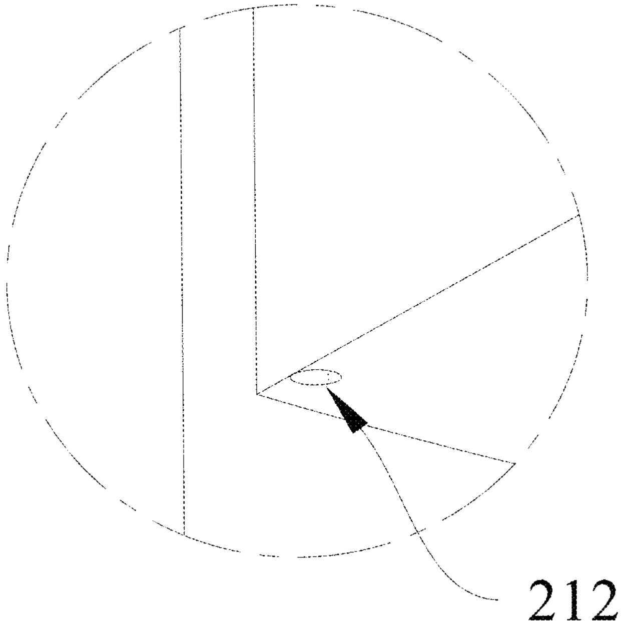
FIG. 3 is an enlarged structural view of part A shown in FIG. 1.

As shown in FIG. 1 to FIG. 3, according to an embodiment of the present disclosure, a spray bottle with storage function is provided. The spray bottle with storage function includes a spray bottle body 1. A first limiting groove 11 is defined in a side wall of a bottle body of the spray bottle body 1, and a first storage box 2 is embedded in the first limiting groove 11. The first storage box 2 includes a first box body 21. A plurality of separated first accommodating cavities 211 are defined in the first box body 21. A first box cover 22 is provided at an opening of each first accommodating cavity 211. Each first box cover 22 is buckled on the corresponding first accommodating cavity 211 and seals the first accommodating cavity 211.

In some embodiments, the first box body 21 is bonded in the first limiting groove 11, and the mounting is more secure.

In some embodiments, the first box body 21 is arranged within the first limiting groove 11 by means of interference fit or snap-in connection. In this way, the first box body 21 may be taken out from the first limiting groove 11, which is not only convenient for filling solid seasonings, but also benefits the cleaning of the first box body 21.

In some embodiments, one end of the first box cover 22 is hinged to the first box body 21. When taking out seasonings from the first accommodating cavity 211 or putting seasonings into the first accommodating cavity 211, the first box cover 22 may be flipped outward to be opened, reducing the possibility that the first box cover 22 falls off.

In some embodiments, a first shaker lid 23 is also provided inside one first accommodating cavity 211 close to an opening of the first accommodating cavity 211. By snapping the first box cover 22 on the first box body 21, the first shaker lid 23 may be snapped into the first accommodating cavity 211. The first shaker lid 23 is defined with a plurality of through holes for dispersing the internal solid seasoning. When in use, the first box cover 22 of the first accommodating cavity 211 is opened, and the first box body 21 may be turned upside down to allow the solid seasoning to be dispersed, making it more convenient to use. The first shaker lid 23 may be provided to evenly disperse the seasoning stored in the first accommodating cavity 211, which is convenient for seasoning. The arrangement of the first shaker lid 23 may also allow a user to better control the amount of seasoning to be taken, further facilitating seasoning.

In some embodiments, a rotating shaft 231 is provided at one end of the first shaker lid 23, and two ends of the rotating shaft 231 protrude from the first shaker lid 23. Correspondingly, a rotating shaft groove 212 is opened at an inner side wall defining the first accommodating cavity 211. One end of the rotating shaft 231 is inserted into the rotating shaft groove. Another end of the first shaker lid 23 away from the rotating shaft 231 is clamped to one side wall defining the first accommodating cavity 211. A pull tab 232 provided on the other end of the first shaker lid 23 away from the rotating shaft 231 is clamped to one side wall defining the first accommodating cavity 211. In other words, the pull tab 232 is near the clamping point. When it is necessary to fill the seasoning into the first accommodating cavity 211, the user only needs to pull the pull tab 232 to release the clamping connection of the end of the first shaker lid 23 away from the rotating shaft 231 with the side wall defining the first accommodating cavity 211, and flip the first shaker lid 23 outward. In other words, the pull tab 232 may be pulled to release the first shaker lid 23 to be flipped outward, which may reduce excessive contact of the user's hand with the first shaker lid 23, and may reduce the possibility that the first shaker lid 23 falls off when sprinkling or adding seasoning, thereby reducing the hygienic hazard.

Figure 4:
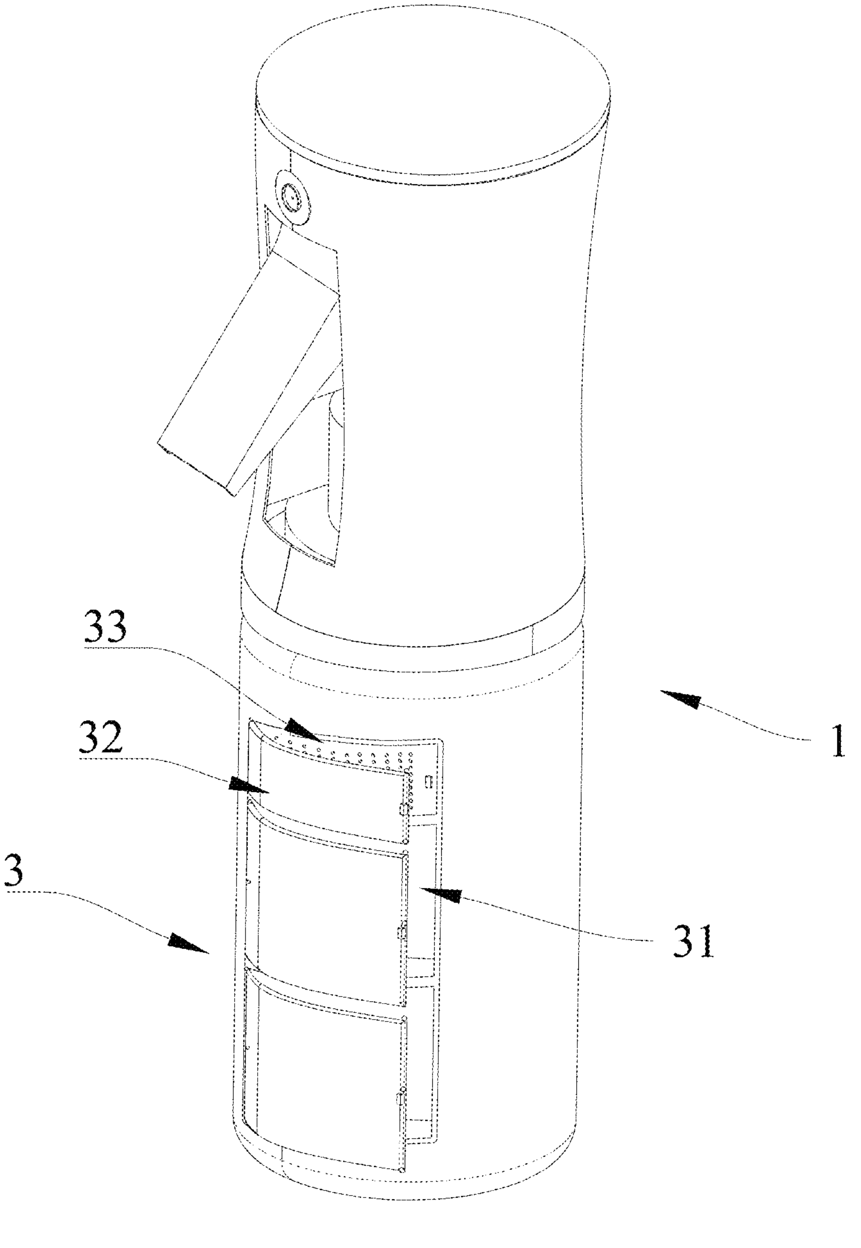
FIG. 4 is an overall schematic structural view of a spray bottle with storage function according to some embodiments of the present disclosure.

As shown in FIG. 4, according to an embodiment of the present disclosure, a spray bottle with storage function is provided. The spray bottle with storage function includes a spray bottle body 1. A second storage box 3 is arranged on a side wall of a bottle body of the spray bottle body 1, and the second storage box 3 is integrally formed with the bottle body. In some embodiments, a side wall of the bottle body of the spray bottle body 1 is recessed toward an inner side of the bottle body to form at least one second accommodating cavity 31. In the present embodiment, three second accommodating cavities 31 are provided, and a second box cover 32 is provided at an opening of each second accommodating cavity 31. In some embodiments, a second shaker lid 33 is arranged between the second box cover 32 and the second accommodating cavity 31 to facilitate the control of the amount of seasoning to be sprinkled.

Figure 5:
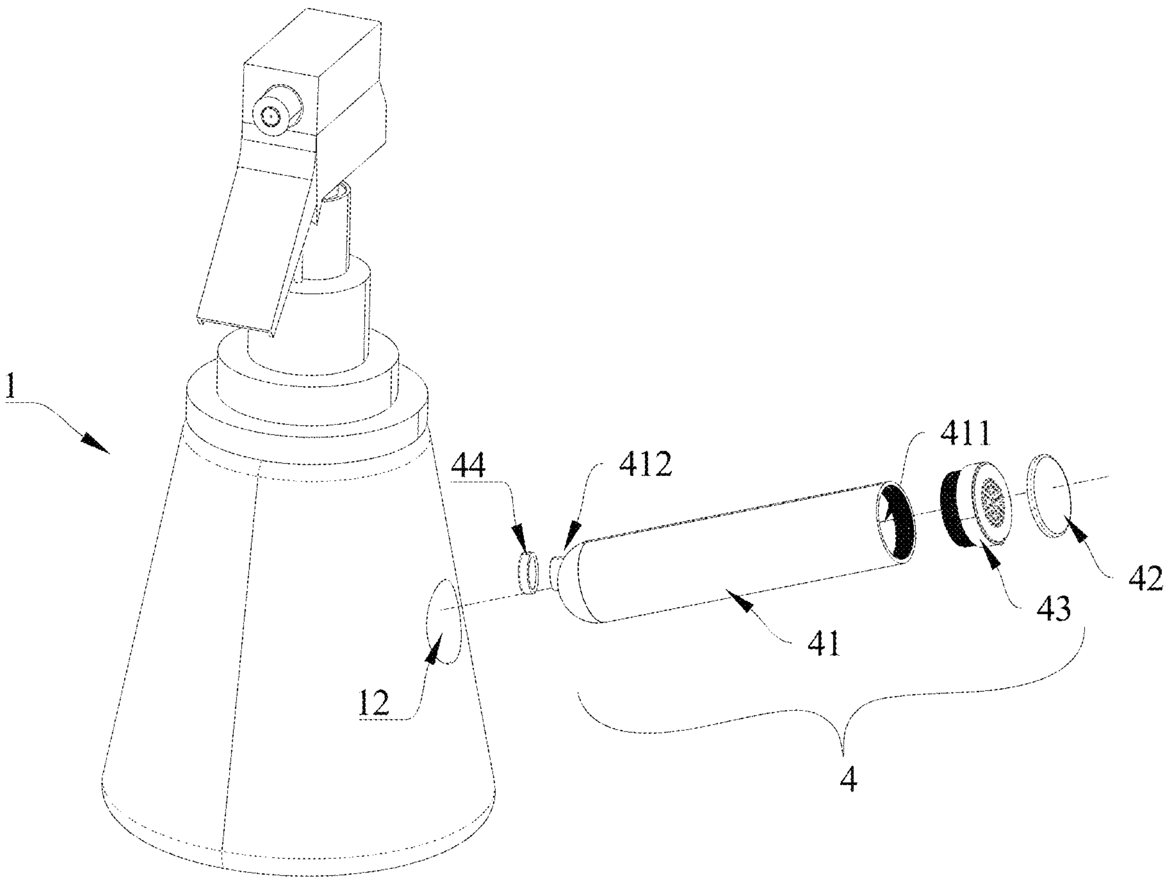
FIG. 5 is an overall exploded schematic structural view of a spray bottle with storage function according to some embodiments of the present disclosure.
Figure 6:
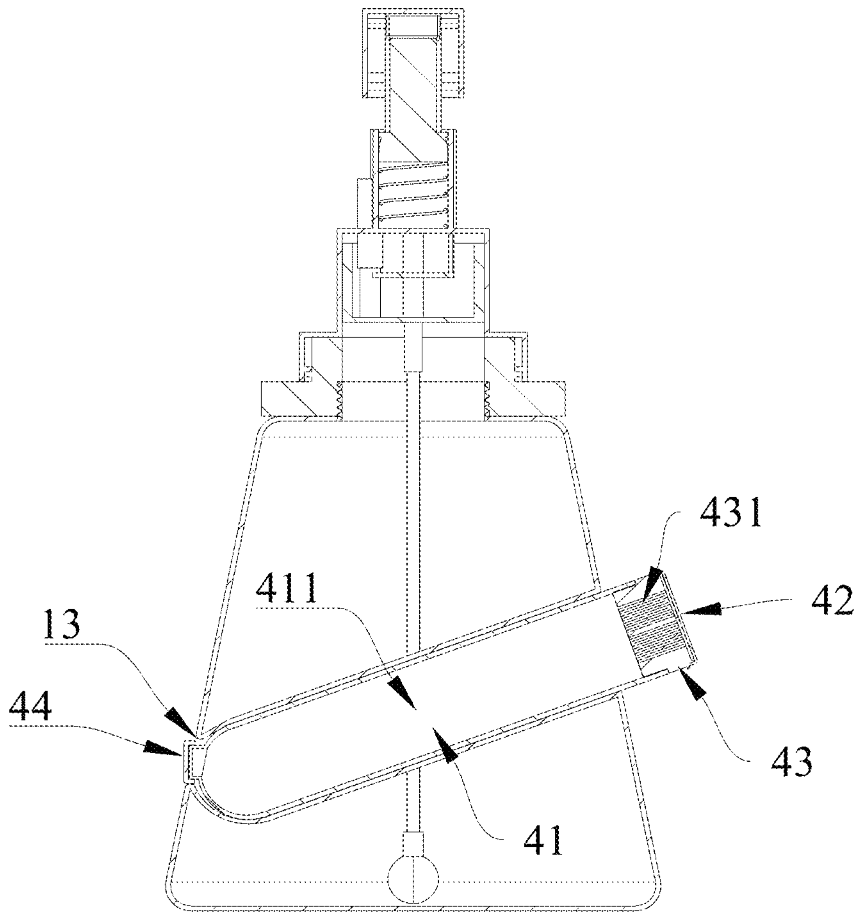
FIG. 6 is an overall cross-sectional schematic structural view of a spray bottle with storage function according to some embodiments of the present disclosure.

As shown in FIG. 5 and FIG. 6, according to an embodiment of the present disclosure, a spray bottle with storage function is provided. The spray bottle with storage function includes a spray bottle body 1. A third storage box 4 is nested in a bottle body of the spray bottle body 1. In some embodiments, the third storage box 4 includes a column-shaped third box body 41. A third accommodating cavity 411 is defined in the third box body 41. A third box cover 42 is provided at one end of the third accommodating cavity 411. In some embodiments, a third shaker lid 43 is disposed between the third box cover 42 and the third accommodating cavity 411. Another end of the third accommodating cavity 411 is provided with a first filling port 412 in communication with the outside of the third box body 41. A first filling cap 44 is provided on the first filling port 412 of the third box body 41. A bottle body of the spray bottle body 1 is defined with a second limiting groove 12 matching the third box body 41. One end defining the second limiting groove 12 is opened with a first through hole 13 on the bottle body of the spray bottle body 1. The size of the first through hole 13 is smaller than the cross-sectional area of an end of the third box body 41, such that the third box body 41 is securely accommodated in the second limiting groove 12. The first filling cap 44 may pass through the first through hole 13, allowing the first filling cap 44 to be removed and the seasoning to be filled into the third box body 41 without removing the third storage box 4 from the spray bottle body 1. When in use, the third box cover 42 is opened, and the spray bottle body 1 is tilted to sprinkle the seasoning. The third storage box 4 may also be taken out of the second limiting groove 12 to sprinkle the seasoning.

Figure 7:
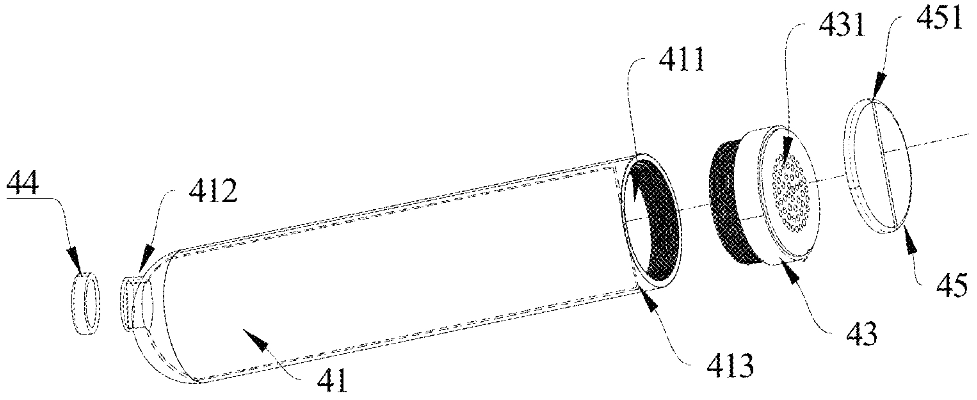
FIG. 7 is an exploded schematic structural view of a storage box according to some embodiments of the present disclosure.

In some embodiments, there are multiple third accommodating cavities 411 defined in the third box body 41. As shown in FIG. 7, there are two third accommodating cavities 411. A partitioning plate 413, extending from one end opening to another filling port of the third box body 41, is arranged within the third box body 41. The partitioning plate 413 separates the third box body 41 into two third accommodating cavities 411. A rotation axis 451 is provided at a middle of the third box cover 42 corresponding to the position of the partitioning plate 413. Cover bodies of the third box cover 42, located on both sides of the rotation axis 451, may be turned up around the rotation axis 451 to be opened, such that the seasoning in each third accommodating cavity 411 may be sprinkled out. As shown in FIG. 6, the leakage through hole 431 passes through both ends of the third shaker lid 43. When the third shaker lid 43 is placed on the third box body 41, a bottom end of the third shaker lid 43 abuts against the partitioning plate 413, such that the seasoning in different third accommodating cavities 411 may only leak out from the leakage through hole 431 on the third shaker lid 43 corresponding to the third accommodating cavity 411.

Figure 8:
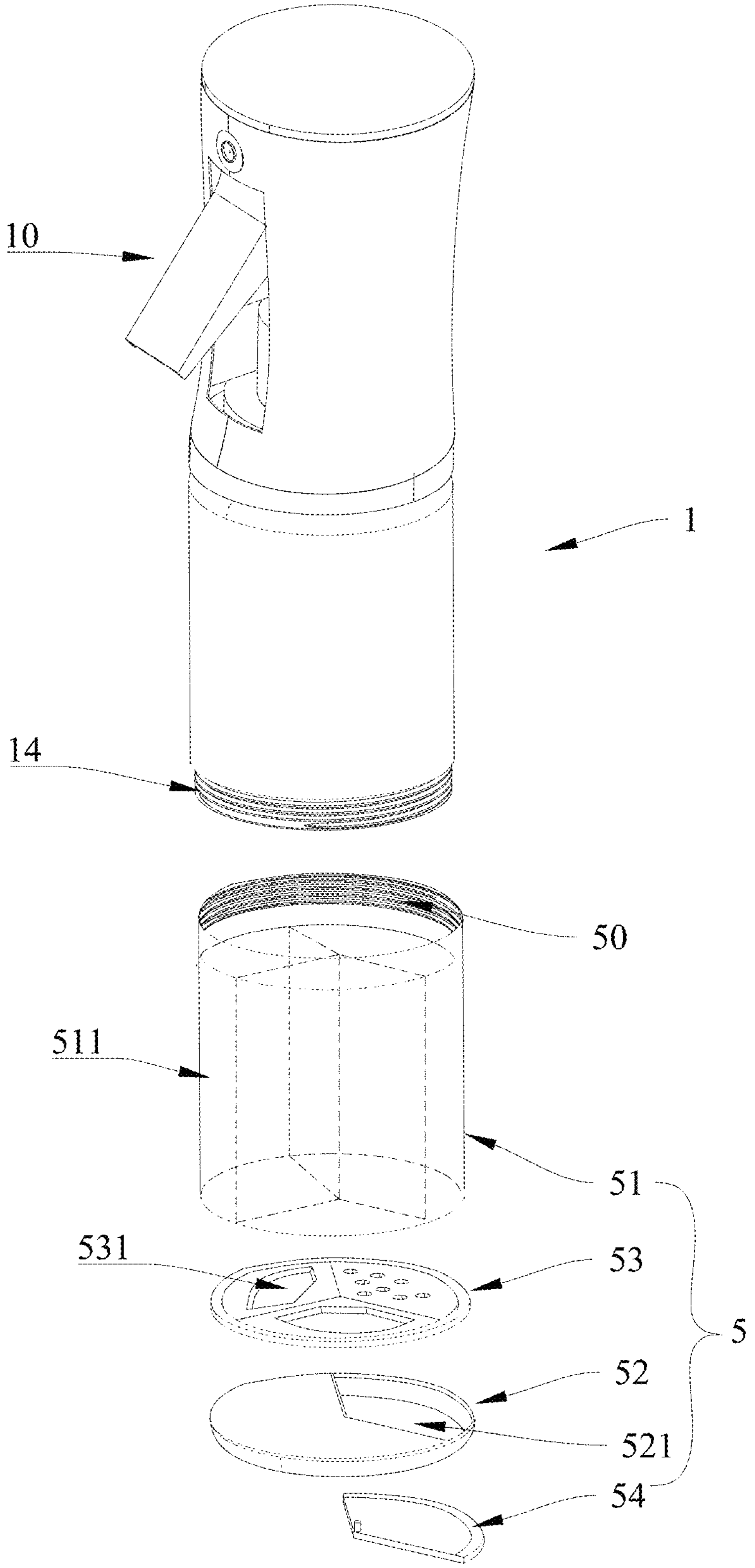
FIG. 8 is an overall exploded schematic structural view of a spray bottle with storage function according to some embodiments of the present disclosure.

As shown in FIG. 8, according to an embodiment of the present disclosure, a spray bottle with storage function is provided. The spray bottle with storage function includes a spray bottle body 1. A fourth storage box 5 is provided at a lower part of a bottle body of the spray bottle body 1. The fourth storage box 5 includes a fourth box body 51, and at least one fourth accommodating cavity 511 is defined inside the fourth box body 51. The fourth box body 51 is detachably connected to the bottle body of the spray bottle body 1. In some embodiments, a first connector 14 is provided at a lower end of the bottle body of the spray bottle body 1, and a second connector 50 matching the first connector 14 is provided at an upper end of the fourth storage box 5. By assembling the first connector 14 with the second connector 50, the fourth storage box 5 may be detachably connected to the spray bottle body 1.

The connection method between the first connector 14 and the second connector 50 may be any one of the following: connection by means of screw and rod, connection by means of slot and buckle, connection by means of magnets, connection by means of snap-in, connection by means of mortise and tenon, etc.

In some embodiments, the fourth box body 51 of the fourth storage box 5 and the bottle body of the spray bottle body 1 may also be arranged as an integrated up-and-down structure, and the processing method may be injection molding, blow molding, casting, forging, etc.

In some embodiments, the fourth storage box 5 also includes a fourth box cover 52, and the fourth box cover 52 is rotatably connected to an opening of the fourth box body 51.

In some embodiments, a sector-shaped first leakage area 521 is provided on the fourth box cover 52, and the size of the first leakage area 521 matches the size of the opening of each fourth accommodating cavity 511 of the fourth box body 51. When the fourth box cover 52 rotates on the fourth box body 51, the first leakage area 521 may correspond to the fourth accommodating cavity 511 above it in turn, such that the seasoning of each fourth accommodating cavity 511 may leak out through the first leakage area 521 separately. An outer side of the fourth box cover 52 is movably connected with a rotary cover 54 that matches the shape of the first leakage area 521, such that when the rotary cover 54 rotates to the first leakage area 521, the seasoning in the fourth box body 51 can not leak out.

In some embodiments, a fourth shaker lid 53 is provided between the fourth box body 51 and the fourth box cover 52. A leakage hole 531 is provided on an opening of each fourth accommodating cavity 511 of the fourth shaker lid 53. Different fourth accommodating cavities 511 correspond to leakage holes 531 with different sizes. A user may match leakage holes 531 with different sizes according to different characteristics of the seasoning such as the size of particles and the amount per use, so as to conveniently control the leakage amount of seasoning. When it is necessary to fill seasonings into the fourth storage box 5, the fourth box cover 52 and the fourth shaker lid 53 need to be removed from the fourth box body 51 and then seasoning is filled into the fourth storage box 5.

In some embodiments, one end of the second connector 50 of the fourth box body 51 has an opening. In other words, this end of the fourth box body 51 where the second connector 50 is located is open. When the second connector 50 is connected to the first connector 14, a lower end of the bottle body of the spray bottle body 1 seals an upper end of the fourth box body 51. When it is necessary to fill seasoning into the fourth storage box 5, it is only needs to remove the fourth box body 51 from the spray bottle body 1 to fill the seasoning, which is more convenient to operate.

Figure 9:
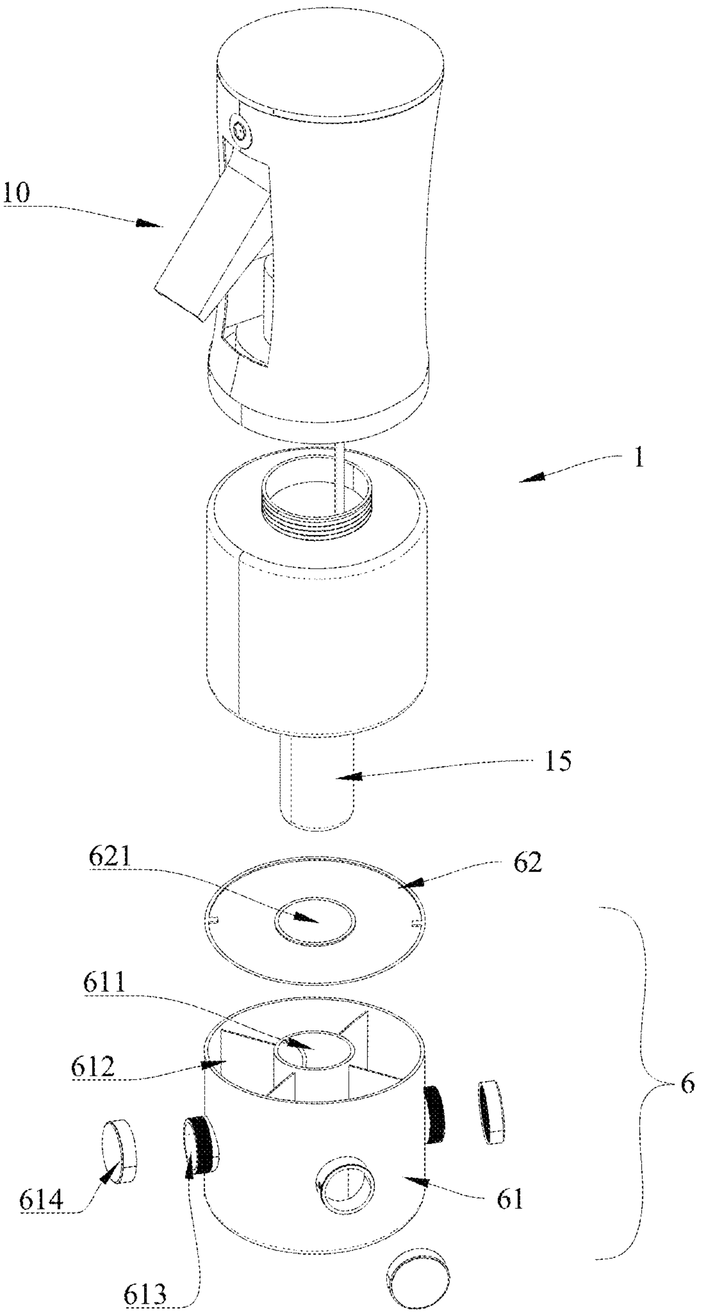
FIG. 9 is an overall exploded schematic structural view of a spray bottle with storage function according to some embodiments of the present disclosure.

In some embodiments, as shown in FIG. 9, a lower end of the spray bottle body 1 is detachably connected to a fifth storage box 6 by means of plug-in connection. The lower end of the spray bottle body 1 extends downwardly with a column-shaped third connector 15. The fifth storage box 6 includes a fifth box body 61, and an upper end of the fifth box body 61 is detachably connected to a second filling cap 62. The fifth box body 61 is arranged with a fourth connector 611 matching the third connector 15, and the second filling cap 62 is defined with a second through hole 621 corresponding to the position of the fourth connector 611. An outer diameter of the third connector 15 matches an aperture of the fourth connector 611 and an aperture of the second through hole 621, such that the third connector 15 is matched with the fourth connector 611. When it is necessary to fill the fifth box body 61 with seasoning, remove the fifth storage box 6 from the lower end of the spray bottle body 1, remove the second filling cap 62 from the fifth box body 61, and then fill the fifth box body 61 with seasoning.

In some embodiments, at least one fifth accommodating cavity 612 is defined in the fifth box body 61. A leakage outlet 613 is opened on an outer surface of the fifth box body 61 corresponding to each fifth accommodating cavity 612. A fifth box cover 614 is provided at each leakage outlet 613 to seal the corresponding leakage outlet 613. The seasoning in the corresponding fifth accommodating cavity 612 may be sprinkled out after the fifth box cover 614 is opened. Alternatively, when the fifth box cover 614 is opened, the seasonings in the corresponding fifth accommodating cavity 612 may be sprinkled out. The connection method of the fifth box cover 614 and the fifth box body 61 is any one of the following: connection by means of screw and rod, connection by means of clamping, connection by means of interference fit, etc.

Figure 10:
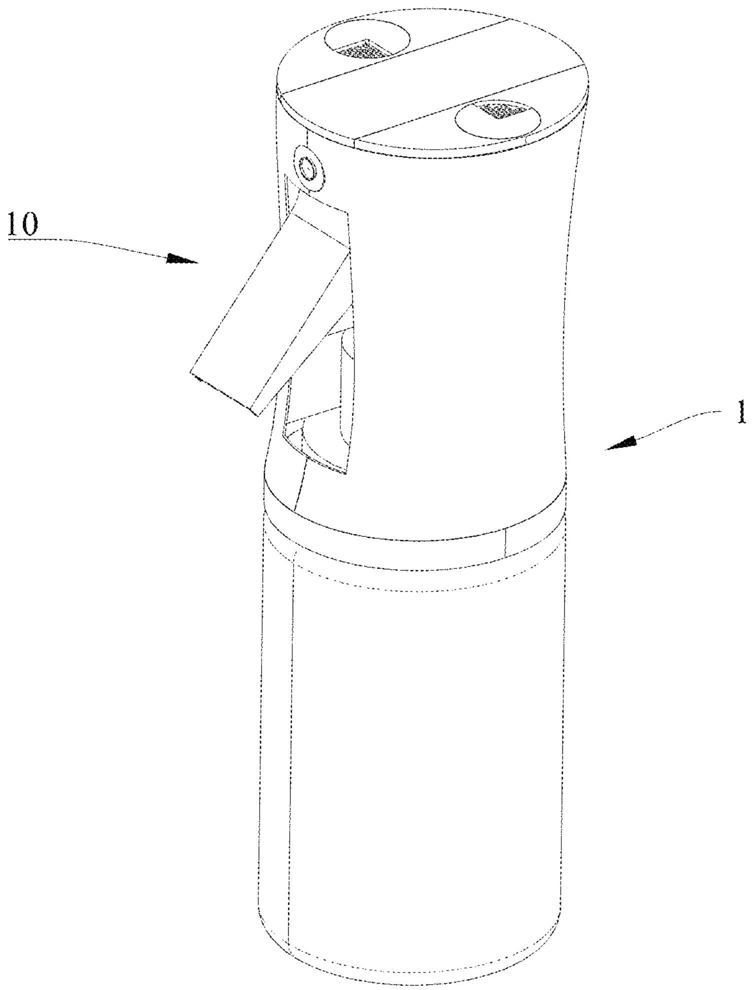
FIG. 10 is an overall schematic structural view of a spray bottle with storage function according to some embodiments of the present disclosure.
Figure 11:
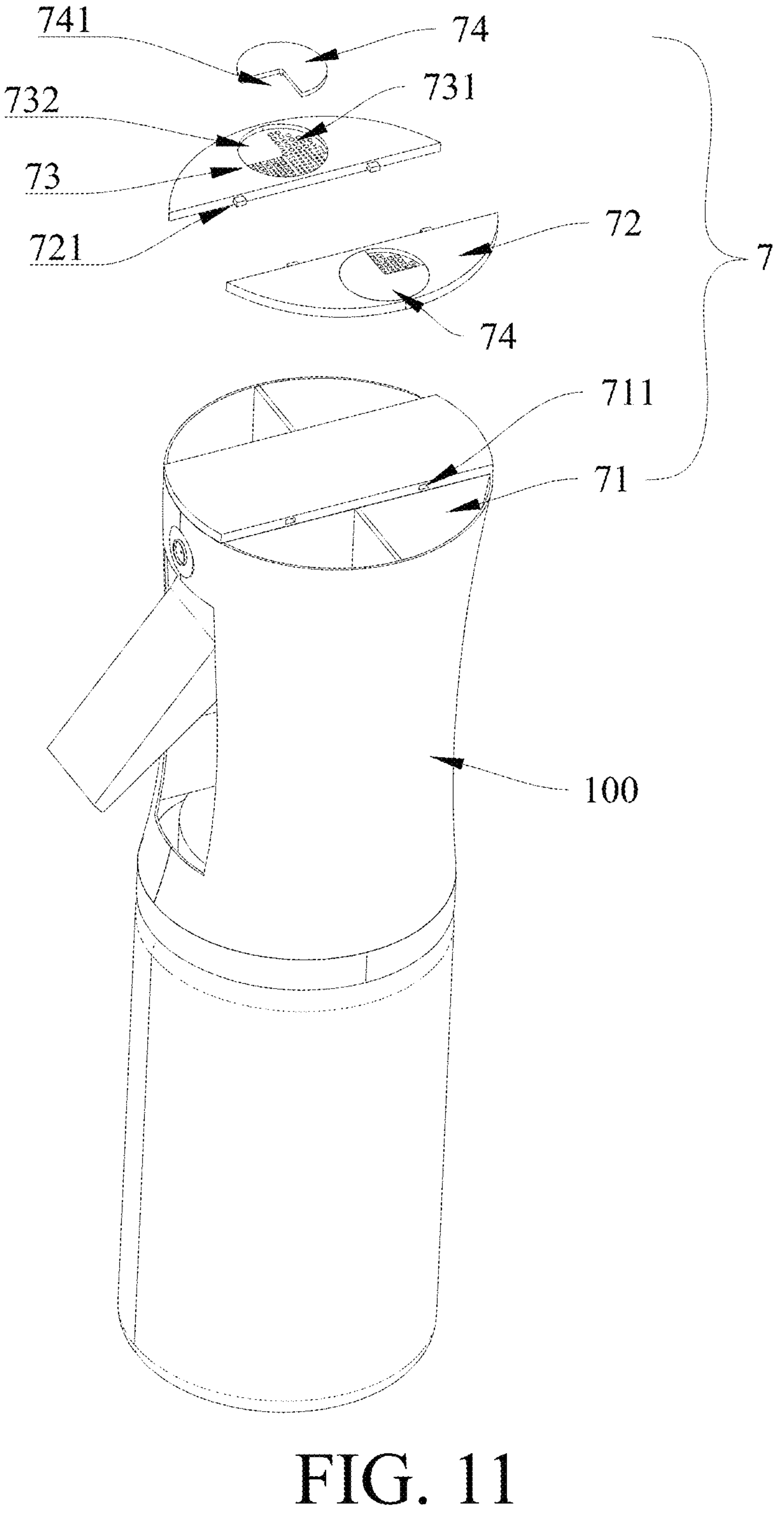
FIG. 11 is an overall exploded schematic structural view of a spray bottle with storage function according to some embodiments of the present disclosure.

As shown in FIG. 10 and FIG. 11, according to an embodiment of the present disclosure, a spray bottle with storage function is provided. The spray bottle with storage function includes a spray bottle body 1. The spray bottle body 1 includes a spray pump 10, and a sixth storage box 7 is provided on the spray pump 10. In some embodiments, a housing 100 is provided on an outside of the spray pump 10. At least one sixth accommodating cavity 71 is defined in the housing 100. In the embodiment shown in FIG. 11, four sixth accommodating cavities 71 are provided, and a sixth box cover 72 is arranged above the sixth accommodating cavity 71.

In some embodiments, a sixth box cover 72 is arranged above an opening of each sixth accommodating cavity 71.

In some embodiments, as shown in FIG. 11, a sixth box cover 72 is provided above two adjacent sixth accommodating cavities 71, and two adjacent sixth accommodating cavities 71 are located on a same side of an upper end panel of the housing 100 where no sixth accommodating cavity 71 is provided. A snap-in groove 711 is defined on a side of that upper end panel of the housing 100 where no sixth accommodating cavity 71 is provided, and a snap-in member 721 is provided on a cross section of the sixth box cover 72. The snap-in member 721 is inserted into the snap-in groove 711 to achieve the snap-in connection between the sixth box cover 72 and the housing 100. The sixth box cover 72 may be removed during use and the seasoning may be filled or taken out of the sixth accommodating cavity 71.

In some embodiments, a sixth shaker lid 73 is provided on the sixth box cover 72 at a position which corresponds to the adjacent positions of two adjacent sixth accommodating cavities 71. Different second leakage areas 731 are provided on the sixth shaker lid 73 corresponding to different sixth accommodating cavities 71. A second rotary cover 74 is rotatably connected above the sixth shaker lid 73. A leakage outlet 741 is defined in the second rotary cover 74. The shape of the leakage outlet 741 matches the shape of each second leakage area 731. When the leakage outlet 741 rotates to the corresponding second leakage area 731, the seasoning only leaks out from that second leakage area 731.

In some embodiments, the sixth shaker lid 73 is provided with two or more second leakage areas 731, with each corresponding to each sixth accommodating cavity 71. As shown in FIG. 10, the sixth shaker lid 73, corresponding to the sixth accommodating cavities 71 on the right side, is defined with two second leakage areas 731 with different leakage hole sizes. The leakage outlet 741 may be rotated with the second rotary cover 74 to align with different second leakage areas 731 to control the amount of seasoning to be leaked out.

Figure 12:
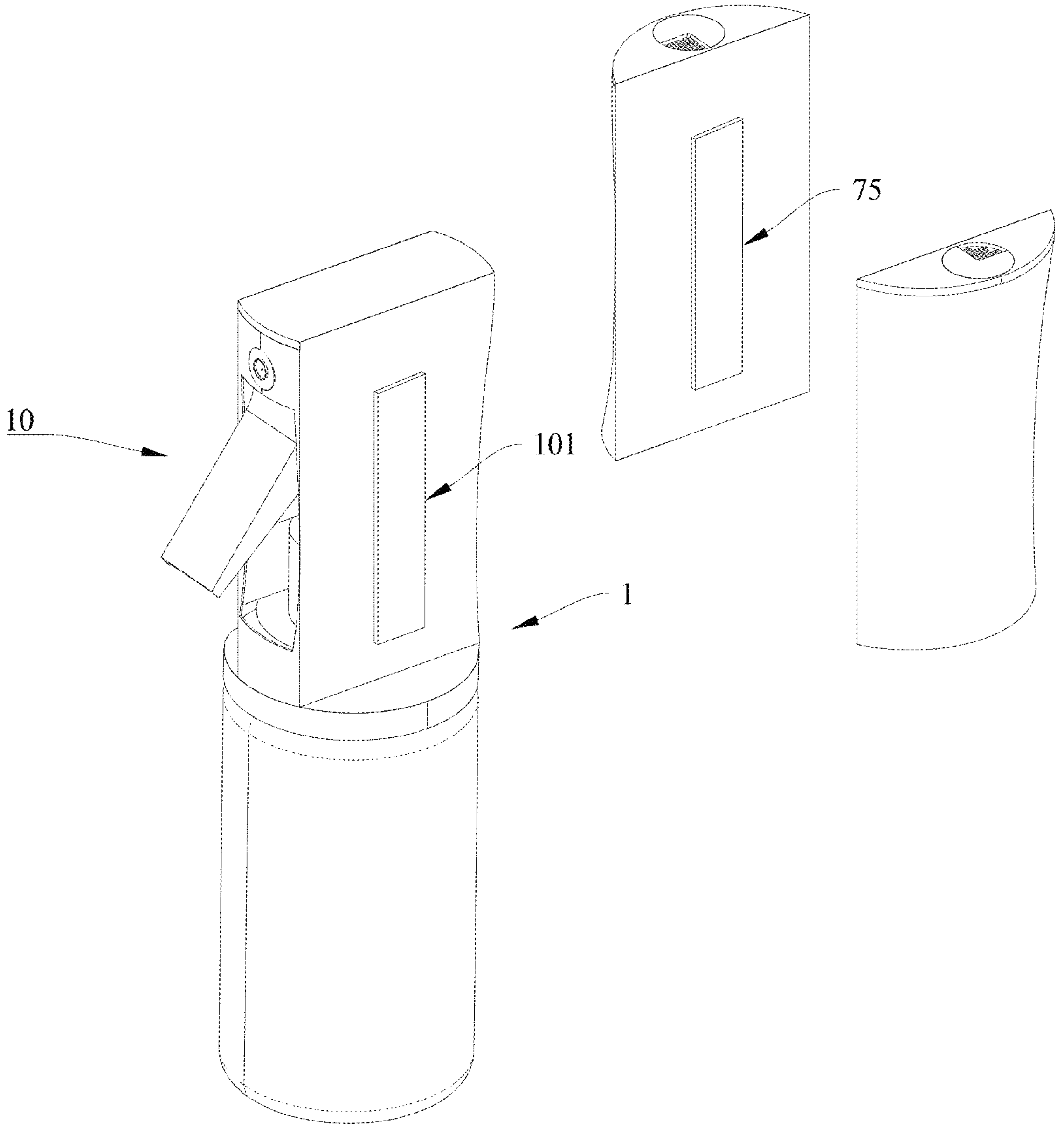
FIG. 12 is an overall schematic structural view of a spray bottle with storage function according to some embodiments of the present disclosure.

In some embodiments, the sixth storage box 7 is detachably connected to the spray pump 10. In some embodiments, as shown in FIG. 12, a fifth connector 75 is provided on an outer wall of the sixth storage box 7, and a sixth connector 101 matching the fifth connector 75 is provided on an outer wall of the spray pump 10. The sixth storage box 7 is detachably connected to the spray pump 10 by means of the fifth connector 75 and the sixth connector 101.

In some embodiments, the fifth connector 75 and the sixth connector 101 may be connected by means of magnetic attraction, key-groove connection, mortise and tenon connection, hook complementary connection, etc.

The above-described embodiments are only some embodiments of the present disclosure, and they should not be construed as limiting the protection scope of the present disclosure. For those of ordinary skill in the art, several modifications and improvements may be made without departing from the concept of the present disclosure, and these all belong to the protection scope of the present disclosure.

What is claimed is:

1. A spray bottle with storage function, comprising a spray bottle body, wherein the spray bottle body is arranged with a storage box, the storage box is arranged with a box cover outside the spray bottle body, a first limiting groove is defined in a side wall of a bottle body of the spray bottle body, and the storage box is detachably embedded in the first limiting groove, the storage box comprises a box body defined with at least one accommodating cavity, the storage box also comprises a shaker lid, the shaker lid is arranged at an opening of the box body, and the shaker lid is disposed between the box cover and the box body.

2. The spray bottle with storage function according to claim 1, wherein one end of the shaker lid is hinged to the box body, and another end of the shaker lid is snap-fitted to the box body.

3. A spray bottle with storage function, comprising a spray bottle body, wherein the spray bottle body is arranged with a storage box, the storage box is defined with at least one accommodating cavity, the storage box is arranged with a box cover outside the spray bottle body, a bottle body of the spray bottle body is defined with a second limiting groove passing through the bottle body, and the storage box is detachably embedded in the second limiting groove.

4. The spray bottle with storage function according to claim 3, wherein the storage box comprises a box body defined with the at least one accommodating cavity, the box cover is arranged at one end of the at least one accommodating cavity, another end of the at least one accommodating cavity is provided with a filling port, the filling port is provided with a filling cap, one end defining the second limiting groove is opened with a through hole smaller than a cross-sectional area of the storage box, the box body is inserted and limited in the second limiting groove, and the filling cap passes through the through hole.

5. A spray bottle with storage function, comprising a spray bottle body, wherein the spray bottle body is arranged with a storage box, the storage box is arranged with a box cover outside the spray bottle body, a bottom of a bottle body of the spray bottle body is provided with a first connector, a top of the storage box is provided with a second connector matching the first connector, the storage box is detachably connected to the bottom of the bottle body of the spray bottle body by means of the first connector and the second connector, the storage box comprises a box body defined with at least one accommodating cavity, each of the at least one accommodating cavity has an opening at a lower end of the box body, the box cover is arranged at the opening of the at least one accommodating cavity, the box cover is rotatably connected to the box body, the box cover is provided with a leakage area matching the opening of each of the at least one accommodating cavity, the opening of each of the at least one accommodating cavity is arranged with a shaker lid, a portion of the shaker lid corresponding to each of the at least one accommodating cavity is provided with at least one leakage hole, and a size of the at least one leakage hole corresponding to each of the at least one accommodating cavity is different.

6. The spray bottle with storage function according to claim 5, wherein the connection between the first connector and the second connector is any one of screw and rod connection, slot and buckle connection, magnetic connection, snap-in connection, and mortise and tenon connection.

7. A spray bottle with storage function, comprising a spray bottle body, wherein the spray bottle body is arranged with a storage box, the storage box is arranged with a box body outside the spray bottle body, a bottom of a bottle body of the spray bottle body is provided with a third connector, a middle portion of the storage box is provided with a fourth connector matching the third connector, the storage box is detachably connected to the bottom of the bottle body of the spray bottle body by means of the third connector and the fourth connector, one side wall of each of the at least one accommodating cavity of the storage box is defined with an leakage outlet configured for sprinkling seasoning, and a box cover is provided at the leakage outlet of each of the at least one accommodating cavity, and a filling cap is detachably connected an upper end of the box body of the storage box.

8. A spray bottle with storage function, comprising a spray bottle body, wherein the spray bottle body is arranged with a storage box, the storage box is defined with at least one accommodating cavity, the storage box is arranged with a box cover outside the spray bottle body, the spray bottle body comprises a spray pump, and the storage box is disposed on the spray pump of the spray bottle body.

9. The spray bottle with storage function according to claim 8, wherein a fifth connector is provided on an outer wall of the storage box, a sixth connector matching the fifth connector is provided on an outer wall of the spray pump, and the storage box is detachably connected to the spray pump by means of the fifth connector and the sixth connector.

* * * * *